United States Patent [19]

Sommazzi et al.

[11] Patent Number: 5,717,060
[45] Date of Patent: Feb. 10, 1998

[54] PROCESS FOR THE PREPARATION OF COPOLYMERS BASED ON CARBON MONOXIDE AND AT LEAST ONE COMPOUND CONTAINING AN ALKENYL UNSATURATION

[75] Inventors: Anna Sommazzi, S. Margherita Ligure; Fabio Garbassi, Novara; Giovanni Mestroni, Trieste; Barbara Milani, Gorizia; Lidia Vicentini, S. Giorgio di Nogaro, all of Italy

[73] Assignee: Enichem S.p.A., Milan, Italy

[21] Appl. No.: 741,901

[22] Filed: Oct. 31, 1996

[30] Foreign Application Priority Data

Apr. 18, 1919 [IT] Italy ............... MI96A0741
Nov. 17, 1995 [IT] Italy ............... MI95A2368

[51] Int. Cl.$^6$ ............ C08G 67/02; B01J 31/18
[52] U.S. Cl. ............ 528/392; 528/392; 524/701; 524/706; 524/710; 524/711; 524/712; 524/714; 524/765; 524/786; 502/162; 502/165; 502/167; 502/169
[58] Field of Search ............ 528/392; 524/701, 524/706, 710, 711, 712, 714, 765, 786; 502/162, 165, 167, 169

[56] References Cited

U.S. PATENT DOCUMENTS

| | | | |
|---|---|---|---|
| 5,310,871 | 5/1994 | Sommazzi et al. | 502/162 |
| 5,314,856 | 5/1994 | Sommazzi et al. | 502/162 |
| 5,324,701 | 6/1994 | Sommazzi et al. | 502/162 |
| 5,346,873 | 9/1994 | Sommazzi et al. | 502/162 |
| 5,369,073 | 11/1994 | Sommazzi et al. | 502/162 |
| 5,408,030 | 4/1995 | Sommazzi et al. | 502/162 |
| 5,556,823 | 9/1996 | Sommazzi et al. | 502/162 |

*Primary Examiner*—Samuel A. Acquah
*Attorney, Agent, or Firm*—Oblon, Spivak, McClelland, Maier & Neustadt, P.C.

[57] ABSTRACT

An improved process is described for the preparation of alternating linear copolymers based on carbon monoxide and at least one compound containing an alkenyl unsaturation which comprises reacting in a liquid solvent under the operating conditions, a mixture of carbon monoxide and one or more compounds containing an alkenyl unsaturation in the presence of:
(i) a catalyst having general formula (I)

$$[Pd(chel)(chel')]^{++}[A^-]_2 \qquad (I)$$

wherein chel and chel' the same or different, represent a nitrogenated or phosphorated bidentate chelating agent, and $A^-$ represents an essentially non-coordinating, non esterifiable and non labile anion of an acid with pKa less than 2; and
(ii) a cocatalyst having general formula (II)

$$[chel''H^+][A'^-] \qquad (II)$$

wherein $A'^-$, the same as or different from $A^-$, has the same meaning defined above and chel'' represents a nitrogenated bidentate chelating agent the same as or different from chel and chel'.

35 Claims, No Drawings

PROCESS FOR THE PREPARATION OF COPOLYMERS BASED ON CARBON MONOXIDE AND AT LEAST ONE COMPOUND CONTAINING AN ALKENYL UNSATURATION

The present invention relates to an improved process for the preparation of alternating linear copolymers based on carbon monoxide and at least one compound containing an unsaturation of the alkenyl type which uses as cocatalyst an acid salt consisting of a proton-containing nitrogenated chelating agent and an anion of an acid with a pKa of less than 2.

Various catalytic processes for the polymerization of mixtures of carbon monoxide (CO) and one or more olefins, suitable for producing linear copolymers in which the CO/olefin unit is alternating, are known in the art. The polymerization can be carried out in gas phase or in liquid phase in polymerization diluents, preferably methanol, in the presence of suitable catalytic systems.

The catalytic systems used in these processes generally derive from the combination of:

1) a salt of a metal belonging to the eighth group of the periodic table;
2) a bidentate base, generally consisting of an alkyl or cycloalkyl hydrocarbon symmetrically substituted by two dialkylphosphinic or diphenylphosphinic groups or by two groups containing at least one nitrogen atom; and
3) an anion of an acid, preferably an acid with a pKa of less than 2.

These catalytic systems are, for example, described in patents EP-121.965, EP-222.454, EP-257.663, EP-305.012 and allow the production of alternating olefin/CO polymers to be obtained with good yields, operating at high temperatures and pressure.

These processes of the known art, however, have disadvantages deriving from the fact that the catalytic systems require the presence of strong acids as cocatalysts (for example $CF_3COOH$, p-toluene sulfonic acid) which, apart from creating problems of a technological nature, for example corrosion of the reactors, tend to become englobed in the polymer reducing its properties. In addition their anions are coordinating, for example $CF_3COO^-$ and p-toluenesulfonate, or labile such as $BF_4^-$ which decomposes and consequently acts as an inhibitor of the active species.

To overcome these disadvantages a process has recently been proposed for the preparation of CO/ethylene copolymers which is based on the use of preformed complexes of palladium which contain two nitrogenated and/or phosphorated bidentate chelating agents for any palladium atom and two non-esterifiable or almost non-esterifiable, non-coordinating, non-labile anions active without the acid cocatalyst (U.S. Pat. No. 5,310,871).

The above catalytic systems however have low productivities and require the presence of a fourth component selected from compounds belonging to the group of quinones, organic oxidizers or aromatic nitrocompounds, preferably 1,4-benzoquinone, capable of raising the polymerization productivity expressed as Kg of polymer produced per g of metal per hour.

The presence of hydroquinone, however, a product of the reduction of 1,4-benzoquinone, generally causes the formation of copolymers with a lower molecular weight (LVN) (Barsacchi, M. et al., Angew. Chem. Int. Ed. Engl. (1991), 30:, 989) and the decomposition of the catalyst to metal palladium which remains englobed in the copolymer reducing its characteristics.

It has now been found that it is possible to overcome the disadvantages of the known art described above by the process of the present invention which is based on the use as cocatalyst of an acid salt having formula (II)

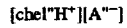

(II)

wherein: chel" represents a nitrogenated bidentate chelating agent and $A'^-$ is the anion of an acid with a pKa of less than 2. This cocatalyst improves the activity and stability of the catalyst (I) and, with the same yield, requires a smaller quantity of oxidizer. In addition, chel"$H^+$ in the presence of free chelating agents coming from the dissociation of the catalyst (I), creates a buffer solution which maintains the concentration of the $H^+$ ions in solution at low and constant values over a length of time, regardless of the dilution. This allows a better reproducibility of the reaction and a reduction in the formation of hydroquinone.

Operating according to the process of the present invention, it is possible to prepare alternating linear copolymers based on carbon monoxide and at least one compound containing an unsaturation of the alkenyl type with high yields, good molecular weights and a reduced content of palladium.

In accordance with this, a first aspect of the present invention relates to a process for the preparation of alternating linear copolymers based on carbon monoxide and at least one compound containing an unsaturation of the alkenyl type which comprises:

(a) reacting in a liquid solvent under the operating conditions the carbon monoxide and one or more compounds containing an unsaturation of the alkenyl type in the presence of:

(i) a catalyst having general formula (I)

(I)

wherein chel and chel', the same or different, represent a nitrogenated or phosphorated bidentate chelating agent, and $A^-$ represents an essentially non-coordinating, non esterifiable and non labile anion of an acid with pKa less than 2; and (ii) a cocatalyst having general formula (II)

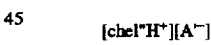

(II)

wherein $A'^-$, the same as or different from $A^-$, has the same meaning defined above and chel" represents a nitrogenated bidentate chelating agent the same as or different from chel and chel'.

Examples of nitrogenated bidentate chelating agents can be selected from those having general formula (III)

(III)

wherein: X and Y, the same or different, represent a bridged organic group having at least three atoms in the bridge of which at least two are carbon atoms. When, in addition to the carbon atoms, the groups X and Y contain other atoms these are preferably nitrogen or oxygen atoms.

Preferred nitrogenated bidentate chelating agents of the present invention are those in which the bridging groups X and Y are equal and contain from 3 to 10 atoms at least two of which are carbon atoms.

Examples of nitrogenated chelating agents are: 2,2'-bipyridyl (bipy); 4,4'-dimethyl-2,2'-bipyridyl (DM-bipy);

4,4'-diphenyl-2,2-bipyridyl (DP-bipy); 5,5'-dimethyl-2,2-bipyridyl; 5-methyl-2,2'-bypyridyl; 6,6'-dimethyl-2,2'bipyridyl; 1,10-phenanthroline(phen); 4-methyl-1,10-phenanthroline; 5-methyl-1,10-phenanthroline; 4,7-dimethyl-1,10-phenanthroline; 3,8-dimethyl-1,10-phenanthroline; 4,7-diphenyl-1,10-phenanthroline; 4,7-dichloro-1,10-phenanthroline; 3,4,7,8-tetramethyl-1,10-phenanthroline (TM-phen); 4,4'-dimethyl-5,5'bioxazol; 2,2'-bipyrimidine.

Phosphorated bidentate chelating agents are selected from those having general formula (IV):

wherein: R represents an alkyl radical with from 2 to 6 carbon atoms, a cycloalkylidene radical with from 2 to 10 carbon atoms or an orthophenylene radical; $R_1$–$R_4$ the same or different, each represent a $C_1$–$C_{10}$ alkyl radical; $C_3$–$C_{10}$ cycloalkyl radical or a $C_6$–$C_{12}$ aromatic radical optionally substituted with a $C_1$–$C_4$ alkyl or alkoxyl radical.

Non-limiting examples of phosphorated bidentate chelating agents suitable for the purposes of the present invention are selected from: 1,3-bis-(diphenylphosphine)propane (DPPP), 1,3-bis(di-4-methoxy-phenylphosphine)propane, 1,4-bis(dicylcohexylphoshpine)butane and 1,2-bis(diphenylphosphine)cyclohexane.

Examples of anions suitable for the purposes of the present invention are selected from hexafluorophosphate ($PF_6^-$), tetrafluoroborate ($BF_4^-$), $(3,5-(CF_3)_2$—$C_6H_3)_4B^-$, tetra(perfluorophenyl)borate $B(C_6F_5)_4^-$, $Al(C_6F_5)_4^-$ and hexafluoroantimoniate.

The catalysts having general formula (I), when $A^-$ is $B(C_6F_5)_4^-$, $Al(C_6F_5)_4^-$ and $(3,5-(CF_3)_2$—$C_6H_3)_4B^-$, are new and are included in the purposes of the present invention.

The catalysts having general formula (I) can be prepared using the method described in U.S. Pat. No. 5,310,871.

Alternatively, the catalysts having general formula (I) where chel and chel' are nitrogenated and the same, can be prepared with a simple and economical process by putting in contact:

palladium acetate and the preformed cocatalyst [chel"H$^+$][A'$^-$], wherein chel" and A'$^-$ are respectively equal to chel and chel' and to $A^-$ according to the following scheme:

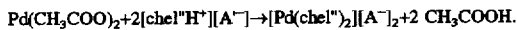

$Pd(CH_3COO)_2 + 2[chel"H^+][A'^-] \rightarrow [Pd(chel")_2][A'^-]_2 + 2\ CH_3COOH.$ The synthesis is carried out under light stirring, at a temperature of between 0° and 40° C., preferably between 20° C. and 35° C.

The solid catalyst (I) is subsequently separated by filtration, washed until the washing water is neutral and dried under vacuum.

The cocatalysts having general formula (II) are acid salts wherein chel"H$^+$ represents a proton-containing nitrogenated bidentate chelating agent and Chel" and A'$^-$ have the meaning defined above.

These cocatalysts can be prepared by putting the nitrogenated bidentate chelating agent in contact with an acid having a pKa of less than 2, at a temperature of between 0° and 40° C., preferably between 20° C. and 35° C. The solid product is then separated by filtration, washed until the washing water is neutral and dried under vacuum.

In the preferred embodiments of the present invention the cocatalysts (II) [bipyH$^+$][PF$_6^-$], [phenH$^+$][PF$_6^-$], [bipyH$^+$][BF$_4^-$] [bipyH$^+$][B(C$_6$F$_5$)$_4^-$ and [phenH$^+$][Al(C$_6$F$_5$)$_4^-$], are used.

The catalyst (I) and cocatalyst (II) which have the general characteristics described above, are active in polymerization processes of mixtures of carbon monoxide and monomers containing an alkenyl unsaturation.

Examples of monomers containing an alkenyl unsaturation suitable for the purposes of the present invention comprise compounds which exclusively consist of carbon and hydrogen and compounds which additionally comprise one or more heteroatoms, such as unsaturated esters. Unsaturated hydrocarbons with from 2 to 12 carbon atoms are preferred.

Examples of these compounds are olefins such as ethylene, propylene, 1-butene, isobutylene, 1-pentene, 1-hexene, 1-octene, 1-dodecene or cyclic compounds such as cyclopentene or aromatic compounds such as styrene, p-methyl-styrene, m-methyl-styrene, p-ethyl-styrene, m-isopropyl-styrene, norbornene and norbornadiene. Ethylene, propylene, styrene, 1-hexene or their mixtures are preferred for the purposes of the present invention.

Examples of solvents suitable for the process of the present invention are methanol, ethanol, 2,2,2-trifluoroethanol or their mixtures.

In the process of the present invention the molar ratio between the carbon monoxide and monomers containing an alkenyl unsaturation is generally between 1:10 and 1:5, preferably between 1:1 and 1:2.

The quantity of catalyst (I) used in the process of the present invention can vary within wide limits. Generally a quantity of catalyst is used which is such as to give a concentration of gram-atom weights of palladium per mole of compound containing an alkenyl unsaturation of between $10^{-6}$ and $10^{-1}$, preferably between $10^{-6}$ and $10^{-3}$.

The quantity of cocatalyst used in the process of the present invention is between 0.01 and 30, preferably between 0.05 and 10, mmoles per gram-atom weight of palladium.

The process of the present invention can be carried out, optionally, in the presence of an organic oxidizer selected from quinones, aliphatic nitriles, nitroaromatic derivatives or air. The preferred oxidizer is 1,4-benzoquinone.

The organic oxidizer, when used, is preferably used in quantities of between 10 and 400 moles per gram-atom weight of palladium.

The polymerization is generally carried out at temperatures of between 20° and 150° C. and at a pressure of between 1 and 200 bars. It is convenient to operate at a temperature of between 30° and 100° C. and at a pressure not higher than 100 bars.

At the end of the polymerization the copolymer is recovered, with the usual separation techniques, in the form of a white solid with an average molecular weight expressed as intrinsic viscosity (LVN) of between 0.1 and 5 dl/g, preferably between 0.2 and 4 dl/g. The LVN (Limiting Viscosity Number) is measured in m-cresol at 100° C. according to ASTM D2857-70 (1977).

The copolymers thus obtained can be characterized with analytic methods such as NMR and FT-IR. The results of these analyses confirm that the copolymers obtained with the process of the present invention have an alternating linear structure. In addition these copolymers have a high molecular weight (LVN) and a low content of catalytic residues.

These copolymers can be used in specialized fields in particular structural applications for example car panels, plastic films and in the packaging industry.

Some illustrative but non-limiting examples are provided for a better understanding of the present invention.

EXAMPLE 1

Synthesis of the Copolymer CO/Ethylene

A) Synthesis of [bipyH$^+$][PF$_6^-$]

2.0 g (13 mmoles) of 2,2'-bipyridyl (bipy) are dissolved in 100 ml of methanol at room temperature. 20 ml of water, 2 ml of concentrated HCl (37%) and 3.12 g of NH$_4$PF$_6$ (19 mmoles) are then added to the solution (bipy:PF$_6^-$=1:1.5). The solution is concentrated by means of the rotavapor to completely eliminate the methanol and the product precipitates as a white solid. It is filtered at the pump, washed with water and dried under vacuum (yield 75%).

Elemental analysis of [bipyH$^+$][PF$_6^-$]:

calculated values: C=39.73%; H=3.00%; N=9.27%; actual values: C=39.6%; H=2.88%; N=9.26%.

B) Synthesis of the Catalyst [Pd(bipy)$_2$][PF$_6$]$_2$ 0.2 g (0.89 mmoles) of Pd(CH$_3$COO)$_2$ are dissolved at room temperature in 25 ml of acetone. After 30 minutes the mixture is filtered and 0.81 g of solid [bipyH$^+$] [PF$_6^-$] are added to the resulting red solution (Pd:[bipyH$^+$][PF$_6^-$]=1:3). The product immediately precipitates as a yellow solid. The mixture is left under stirring at room temperature for 30 minutes. The solid is then filtered at the pump, washed with acetone and dried under vacuum (yield 76%).

Elemental analysis for PdC$_{20}$H$_{16}$N$_4$P$_2$F$_{12}$: Calculated values: C=33.9%; H=2.28%; N=7.91%; Actual values: C=33.8%; H=2.23%; N=7.83%.

C) Preparation of the Copolymer CO/Ethylene 500 ml of methanol, 0.25 mmoles of [Pd(bipy)$_2$][PF$_6$]$_2$, 0.25 mmoles of [bipyH$^+$][PF$_6^-$], 20 mmoles of 1,4-benzoquinone and a mixture of CO/ethylene (1:1) are fed into a 2 litre pressure-resistant reactor up to a pressure of 56 atms. After 5 hours of reaction at 70° C., the reactor is cooled to room temperature and the non-reacted gas is discharged. The copolymer is recovered by filtration, washed with methanol and dried at 60° C. under vacuum. 70 g of alternating linear copolymer are obtained, resulting from NMR analysis, corresponding to 2632 g of copolymer per g of palladium (CP/g Pd). The copolymer has a LVN of 1.47 dl/g and a content of Pd equal to 207 ppm.

EXAMPLE 2

The same procedure is carried out as in example 1, using in the polymerization reaction 0.5 mmoles of [bipyH$^+$][PF$_6^-$]. 80 g of alternating linear copolymer are obtained, as shown by NMR analysis, corresponding to 3007 g of CP/g Pd. The copolymer has a LVN of 1.52 dl/g and a content of Pd equal to 211 ppm.

EXAMPLE 3 (COMPARATIVE)

The same procedure is carried out as in example 1, but without the addition of [bipyH$^+$][PF$_6^-$] in the reaction environment. 61 g of alternating copolymer are obtained, corresponding to 2292 g CP/g Pd. The copolymer has a LVN of 1.42 dl/g and a content of Pd equal to 325 ppm.

EXAMPLE 4

Preparation of the Terpolymer CO/Ethylene/Propylene

The same procedure is carried out as in example 1, using 0.5 mmoles of [Pd(bipy)$_2$][PF$_6$]$_2$, 0.25 mmoles of [bipyH$^+$][PF$_6^-$], 40 mmoles of 1,4-benzoquinone and adding 50 g of propylene. 141 g of alternating terpolymer are obtained, corresponding to 2650 g TP/g Pd. The terpolymer has a LVN of 1.0 dl/g and a content of Pd equal to 285 ppm.

EXAMPLE 5

Preparation of the Terpolymer CO/Ethylene/Propylene

The same procedure is carried out as in example 4, using 0.35 mmoles of [bipyH$^+$][PF$_6^-$]. 167 g of alternating terpolymer are obtained, corresponding to 3140 g TP/g Pd. The terpolymer has a LVN of 1.0 dl/g and a content of Pd equal to 212 ppm.

EXAMPLE 6 (COMPARATIVE)

Preparation of the Terpolymer CO/Ethylene/Propylene

The same procedure is carried out as in example 4, but without the cocatalyst. 91 g of alternating terpolymer are obtained, corresponding to 1700 g TP/g Pd. The terpolymer has a LVN of 0.6 dl/g and a content of Pd equal to 540 ppm.

EXAMPLE 7 (COMPARATIVE)

The same procedure is carried out as in example 6, using 60 mmoles of 1,4-benzoquinone. 139 g of alternating terpolymer are obtained, corresponding to 2613 g TP/g Pd. The terpolymer has a LVN of 0.5 dl/g and a content of Pd equal to 500 ppm.

The example shows that with the same yields a greater quantity of oxidizer is necessary.

EXAMPLE 8

Preparation of the Terpolymer CO/Ethylene/Propylene

The same procedure is carried out as in example 4, but using 100 g of propylene. 136 g of alternating terpolymer are obtained, corresponding to 2556 g TP/g Pd. The terpolymer has a LVN of 0.92 dl/g and a content of Pd equal to 256 ppm.

EXAMPLE 9 (COMPARATIVE)

Preparation of the Terpolymer CO/Ethylene/Propylene

The same procedure is carried out as in example 8, but without the cocatalyst. 70 g of alternating terpolymer are obtained, corresponding to 1316 g TP/g Pd. The terpolymer has a LVN of 0.6 dl/g and a content of Pd equal to 570 ppm.

EXAMPLE 10

Preparation of the Terpolymer CO/Ethylene/Propylene

The same procedure is carried out as in example 4, using in the polymerization reaction 0.25 mmoles of [Pd(bipy)$_2$][PF$_6$]$_2$, 20 mmoles of 1,4-benzoquinone and 0.25 mmoles of [bipyH$^+$][PF$_6^-$]. 55 g of terpolymer are obtained, corresponding to 2068 g TP/g Pd. The terpolymer has a LVN of 1.0 dl/g and a content of Pd equal to 324 ppm.

EXAMPLE 11

Preparation of the Terpolymer CO/Ethylene/Propylene

The same procedure is carried out as in example 10, using 0.5 mmoles of [bipyH$^+$][PF$_6^-$]. 74 g of terpolymer are obtained, corresponding to 2782 g TP/g Pd. The terpolymer has a LVN of 1.4 dl/g and a content of Pd equal to 248 ppm.

EXAMPLE 12

Preparation of the Terpolymer CO/Ethylene/Propylene

The same procedure is carried out as in example 10, using 1.0 mmoles of [bipyH$^+$][PF$_6^-$]. 88.5 g of terpolymer are obtained, corresponding to 3327 g TP/g Pd. The terpolymer has a LVN of 1.5 dl/g and a content of Pd equal to 224 ppm.

EXAMPLE 13

Synthesis [PhenH$^+$][PF$_6^-$]

2.0 g (10 mmoles) of 1,10-phenanthroline (phen) are dissolved in 100 ml of methanol at room temperature. 20 ml of water, 2 ml of concentrated HCl (37%) and 3.12 g of NH$_4$PF$_6$ (19 mmoles) are then added to the solution (phen:PF$_6^-$=1:1.9). The solution is concentrated by means of the rotavapor to completely eliminate the methanol and the product precipitates as a white solid.

It is filtered at the pump, washed with water and dried under vacuum (yield 75%).

Elemental analysis for [PhenH$^+$][PF$_6^-$]: Calculated values: C=44.17%; H=2.78%; N=8.59%; Actual values: C=44.1%; H=2.77%; N=8.75%.

EXAMPLE 14

Preparation of the Terpolymer CO/Ethylene/Propylene

The same procedure is carried out as in example 10, using in the polymerization reaction 0.25 mmoles of [PhenH$^+$][PF$_6^-$]. 56.5 g of terpolymer are obtained corresponding to 2124.4 g TP/g Pd. The terpolymer has a LVN of 1.26 dl/g and a content of Pd equal to 200 ppm.

EXAMPLE 15

Preparation of the Terpolymer CO/Ethylene/Propylene

The same procedure is carried out as in example 10, but without the cocatalyst. 41 g of terpolymer are obtained corresponding to 1540 g TP/g Pd. The terpolymer has a LVN of 1.27 dl/g and a content of Pd equal to 350 ppm.

EXAMPLE 16

Preparation of the Copolymer CO/Ethylene 1200 ml of methanol, 0.1 mmoles of [Pd(DPPP)(bipy)$_2$][PF$_6$]$_2$, 0.1 mmoles of [bipyH$^+$][PF$_6^-$] and a mixture of CO/ethylene (1:1) are fed into a 2 litre pressure-resistant reactor up to a pressure of 56 atms. After 5 hours of reaction at 80° C., the reactor is cooled to room temperature and the non-reacted gas is discharged. The copolymer is recovered by filtration, washed with methanol and dried at 60° C. under vacuum.

269 g of white alternating linear copolymer are obtained, resulting from NMR analysis, corresponding to 25280 g of CP/g Pd (25 Kg CP/g Pd). The copolymer has a LVN of 1.27 dl/g and a content of Pd equal to 18 ppm.

EXAMPLE 17 (COMPARATIVE)

The same procedure is carried out as in example 16, but without the cocatalyst. 230 g of copolymer are obtained corresponding to 21620 g of copolymer per g of palladium (CP/g Pd). The copolymer has a LVN of 1.66 dl/g and a content of Pd equal to 18 ppm.

EXAMPLE 18

Preparation of the Copolymer CO/Styrene 25 ml of methanol, 0.5 ml of dimethoxy propane, 0.06 mmoles of [Pd(bipy)$_2$][PF$_6$]$_2$, 0.06 mmoles of [bipyH$^+$][PF$_6^-$], and 25 ml of styrene are charged into a 250 ml pressure-resistant reactor equipped with teflon liner. The reactor is charged with a pressure of CO of 40 atms measured at room temperature. After 2 hours of reaction at 70° C., the reactor is cooled to room temperature and the non-reacted gas is discharged. The copolymer is precipitated with methanol (150 ml), filtered, washed with methanol and dried at room temperature under vacuum. 1.06 g of white alternating linear copolymer are obtained, as shown by NMR analysis, corresponding to 166 g of CP/g Pd.

EXAMPLE 19 (COMPARATIVE)

The same procedure is carried out as in example 18, but without the cocatalyst. 0.95 g of alternating copolymer are obtained, as shown by NMR analysis, corresponding to 148 g of CP/Pd.

EXAMPLE 20

Preparation of the Copolymer CO/Ethylene

A) Synthesis [bipyH$^+$][BF$_4^-$]

1.0 g (6.4 mmoles) of bipy are dissolved in 30 ml of methanol at room temperature. 1.87 g of an aqueous solution of HBF$_4$ at 60% are added to the colourless solution (bipy:HBF$_4$=1:2). After 10 minutes the solution is concentrated by means of the rotavapor until the initial precipitation of the product as a white solid. Ethyl ether is added and the mixture is left to rest at room temperature for 1 hour. The white solid is then filtered at the pump, washed with ethyl ether and dried under vacuum.

Elemental analysis for [bipyH$^+$][BF$_4^-$]: Calculated values: C=49.2%; H=3.72%; N=11.48%; Actual values: C=48.8%; H=3.64%; N=11.4%.

B) Synthesis of [Pd(bipy)$_2$[BF$_4$]$_2$ 0.2 g (0.89 mmoles) of Pd(CH$_3$COO)$_2$ are dissolved at room temperature in 25 ml of acetone. After 30 minutes the mixture is filtered and 0.48 g of [bipyH$^+$][BF$_4^-$] dissolved in a minimum quantity of acetone are added to the resulting red solution (Pd:[bipyH$^+$][BF$_4^-$]=1:3). There is the immediate precipitation of the product as a yellow solid. The mixture is left under stirring at room temperature for 30 minutes. The solid is then filtered at the pump, washed with acetone and dried under vacuum (yield 83).

Elemental analysis for PdC$_{20}$H$_{16}$N$_4$B$_2$F$_8$:

Calculated values: C=40.6%; H=2.72%; N=9.46%; actual values: C=40.5%; H=2.64%; N=9.61%.

C) Preparation of the Copolymer CO/Ethylene 500 ml of methanol, 0.25 mmoles of [Pd(bipy)$_2$][BF$_4$]$_2$, 0.25 mmoles of [bipyH$^+$][BF$_4^-$], 20 mmoles of 1,4-benzoquinone and a mixture of CO/ethylene (1:1) are fed into a 2 litre pressure-resistant reactor up to a pressure of 56 atms. After 5 hours of reaction at 70° C., the reactor is cooled to room temperature and the non-reacted gas is discharged. The copolymer is recovered by filtration, washed with methanol and dried at 60° C. under vacuum.

12 g of alternating linear copolymer are obtained, resulting from NMR analysis, corresponding to 451 g of copolymer per g of palladium (CP/g Pd).

EXAMPLE 21 (COMPARATIVE)

The same procedure is carried out as in example 20, but without the cocatalyst. 6 g of alternating copolymer are obtained, corresponding to 226 g of Cp/Pd.

EXAMPLE 22

Preparation of the Terpolymer CO/Ethylene/Styrene

The same procedure is carried out as in example 4, but using 0.125 mmoles of [bipyH$^+$][PF$_6^-$] and 50 ml of styrene instead of propylene. After 5 hours of reaction at 75° C., the reactor is cooled to room temperature and the non-reacted gas is discharged. The terpolymer is recovered by filtration, washed with methanol and dried at 60° C. under vacuum. 266 g of terpolymer are obtained, corresponding to 5,000 g of TP/g Pd. The terpolymer has a LVN of 0.96 dl/g and a content of Pd equal to 190 ppm.

Example 23 (COMPARATIVE)

The same procedure is carried out as in example 22, but without the [bipyH$^+$][PF$_6^-$]. 194 g of terpolymer are obtained corresponding to 3647 g of TP/g Pd. The terpolymer has a LVN of 0.85 dl/g and a content of Pd equal to 625 ppm.

EXAMPLE 24

Synthesis of the Catalyst [Pd(Bipy)$_2$][B(C$_6$F$_5$)$_4$]$_2$

A) Synthesis of [bipyH][B(C$_6$F$_5$)$_4$]

0.16 g (1.0 mmoles) of bipy are dissolved in 10 ml of methanol at room temperature. 0.12 ml of HCL 37% and 0.77 g (1.1 mmoles) of LiB(C$_6$F$_5$)$_4$ are added in sequence to the solution under magnetic stirring (bipy:B(C$_6$F$_5$)$_4^-$=1:1.1). Water is then added dropwise and after 3 ml the product begins to precipitate as a white solid. A further 7 ml of water are added and the mixture is left under stirring for 10 minutes at room temperature. The white solid is then filtered at the pump and washed with water. Yield: 0.68 g (80%); M.W. 836.24.

Elemental analysis for [bipyH][B(C$_6$F$_5$)$_4$]: Calculated values: C=48.8%; H=1.08%; N=3.35%; Actual values: C=48.0%; H=0.94%; N=3.26%.

B) Synthesis of [Pd(Bipy)]$_2$[B(C$_6$F$_5$)$_4$]$_2$ 0.20 g (1.89 mmoles) of [Pd(CH$_3$COO)$_2$] are dissolved in 25 ml of acetone and the resulting solution is maintained under magnetic stirring for 30 minutes and then filtered on paper. 1.56 g (1.87 mmoles) of [bipyH][B(C$_6$F$_5$)$_4$] are added to the filtrate and a clear solution is obtained. The solvent is removed at the rotavapor and 5 ml of methanol are added to activate the precipitation of the product as a white solid. 10 ml of water are added to complete the precipitation and the system is left under stirring for 15 minutes.

The white solid is then filtered at the pump and washed with water. Yield: 1.42 g (92%); M.W. 1776.88.

Elemental analysis: Calculated values: C=46.0%; H=0.91%; N=3.15%; Actual values: C=45.8%; H=0.90%; N=3.09%.

EXAMPLE 25

Synthesis of the Terpolymer CO/Ethylene/Propylene

The same procedure is carried out as in example 4, using 0.25 mmoles of [bipyH$^+$][B(C$_6$F$_5$)$_4$]$^-$, 0.125 mmoles of [Pd (Bipy)$_2$]. [B(C$_6$F$_5$)$_4$]$_2$ and 10 mmoles of 1,4-benzoquinone. 42 g of alternating linear terpolymer are obtained corresponding to 3158 g of TP/g Pd. The terpolymer has a LVN of 1.1 dl/g and a content of Pd equal to 14 ppm.

EXAMPLE 26 (COMPARATIVE)

The reaction is carried out as described in example 25, but without the cocatalyst. 23 g of alternating linear terpolymer are obtained corresponding to 1729 g of TP/g Pd.

We claim:

1. A process for the preparation of alternating linear copolymers based on carbon monoxide and at least one compound containing an unsaturation of the alkenyl type which comprises reacting, in a solvent liquid under the operating conditions with or without an anhydrifying compound, the carbon monoxide and one or more compounds containing an unsaturation of the alkenyl type in the presence of:

(i) a catalyst having general formula (I)

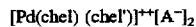

(I)

wherein chel and chel', the same or different, represent a nitrogenated or phosphorated bidentate chelating agent, and A$^-$ represents an essentially non-coordinating and non esterifiable anion of an acid with pKa less than 2; and (ii) a cocatalyst having general formula (II)

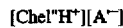

(II)

wherein A'$^-$, the same as or different from A$^-$, has the same meaning defined above and chel" represents a nitrogenated bidentate chelating agent the same as or different from chel and chel'.

2. The process according to claim 1, characterized in that the nitrogenated bidentate chelating agents are selected from those having general formula (III)

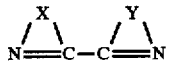

(III)

wherein: X and Y, the same or different, represent a bridged organic group having at least three atoms in the bridge of which at least two are carbon atoms.

3. The process according to claim 2, wherein when, in addition to the carbon atoms, groups X and Y contain other atoms these are selected from oxygen or nitrogen.

4. The process according to claim 3, characterized in that the nitrogenated bidentate chelating agents having the same bridging groups X and Y and contain from 3 to 10 atoms of which at least two are carbon atoms.

5. The process according to claim 2, characterized in that the nitrogenated bidentate chelating agents are selected from 2,2'-bipyridyl; 4,4'-dimethyl-2,2'bipyridyl; 4,4'-diphenyl-2, 2-bipyridyl; 5,5'-dimethyl-2,2-bipyridyl; 5-methyl-2,2'-bypyridyl; 1,10-phenanthroline; 4-methyl-1,10-phenanthroline; 5-methyl-1,10-phenanthroline; 4,7-dimethyl-1,10-phenanthroline; 3,8-dimethyl-1,10-phenanthroline; 4,7-diphenyl-1,10-phenanthroline; 4,7-dichloro-1,10-phenanthroline; 3,4,7,8-tetramethyl-1,10-phenanthroline; 4,4'-dimethyl-5,5'bioxazol; 2,2'-bipyrimidine.

6. The process according to claim 1, characterized in that the phosphorated bidentate chelating agents are selected from those having general formula (IV):

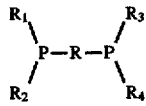

(IV)

wherein: R represents an alkyl radical with from 2 to 6 carbon atoms, a cycloalkylidene radical with from 2 to 10 carbon atoms or an orthophenylene radical; R$_1$–R$_4$ the same or different, each represent a C$_1$–C$_{10}$ alkyl radical; C$_3$–C$_{10}$ cycloalkyl radical or a C$_6$–C$_{12}$ aromatic radical optionally substituted with a C$_1$–C$_4$ alkyl or alkoxyl radical.

7. The process according to claim 6, characterized in that the phosphorated bidentate chelating agents are selected from 1,3-bis-(diphenylphosphine)propane; 1,3-bis(di-4-methoxy-phenylphosphine)propane; 1,4-bis (dicylcohexylphoshpine)butane and 1,2-bis (diphenylphosphine)cyclohexane.

8. The process according to claim 1, characterized in that A⁻ is selected from hexafluorophosphate, tetrafluoroborate, (3,5-(CF₃)₂—C₆H₃)₄B⁻, B(C₆F₅)₄⁻, Al(C₆F₅)₄⁻ and hexafluoroantimoniate.

9. The process according to claim 8, wherein A⁻ is selected from hexafluorophosphate and tetra (perfluorophenyl)borate.

10. The process according to claim 1, characterized in that the cocatalyst is selected from [bipyH⁺][PF₆⁻], [phenH⁺][PF₆⁻], [bipyH⁺][BF₄⁻].

11. The process according to claim 1, characterized in that it additionally contains an organic oxidizer selected from quinones, aliphatic nitriles, nitroaromatic derivatives and organic peroxides.

12. The process according to claim 11, characterized in that the organic oxidizer is 1,4-benzoquinone.

13. The process according to claim 1, characterized in that the compound containing the alkenyl unsaturation is selected from olefins such as ethylene, propylene, 1-butene, isobutylene, 1-pentene, 1-hexene, 1-octene, 1-dodecene or a cyclic compound such as cyclopentene or an aromatic compound such as styrene, p-methyl-styrene, m-methylstyrene, p-ethyl-styrene, m-isopropyl-styrene, norbornene or their mixtures.

14. The process according to claim 1, characterized in that the solvent is selected from methanol, ethanol and 2,2,2-trifluoro-ethanol or their mixtures.

15. The process according to claim 1, characterized in that the anhydrifying compound is diemthoxy propane.

16. The process according to claim 1, characterized in that the molar ratio between the compound containing the alkenyl unsaturation and the carbon monoxide is between 1:10 and 1:5.

17. The process according to claim 16, characterized in that the molar ratio is between 1:1 and 1:2.

18. The process according to claim 1, characterized in that the quantity of catalyst (I) is such as to give a concentration of gram-atom weights of palladium per mole of compound containing an unsaturation of the alkenyl type of between 10⁻⁶ and 10⁻¹.

19. The process according to claim 1, characterized in that the cocatalyst (II) is used in a quantity of between 0.01 and 30 moles per gram-atom weight of palladium.

20. The process according to claim 19, characterized in that the quantity of cocatalyst is between 0.05 and 10 moles per gram-atom weight of palladium.

21. The process according to claim 11, characterized in that the quantity of organic oxidizer is between 10 and 400 moles per gram-atom weight of palladium.

22. The process according to claim 1, characterized in that the polymerization reaction is carried out at a temperature of between 20° and 150° C. and a pressure of between 1 and 200 bars.

23. The process according to claim 22, characterized in that the temperature is between 30° and 100° C. and the pressure is not higher than 100 bars.

24. A compound which can be used as cocatalyst in a process for the preparation of alternating linear copolymers based on carbon monoxide and at least one compound containing an alkenyl unsaturation definable with the general formula (II)

[chel"H⁺][A'⁻]        (II)

wherein: chel" is a nitrogenated bidentate chelating agent and A'⁻ is the anion of an acid having a pKa of less than 2.

25. The compound according to claim 24, characterized in that the nitrogenated bidentate chelating agent is selected from those having general formula (III)

$$\underset{N=\!\!=C-C=\!\!=N}{\overset{X\quad\quad Y}{\diagup\!\diagdown\;\;\diagup\!\diagdown}}$$    (III)

wherein: X and Y, the same or different, represent a bridged organic group each having at least three atoms in the bridge of which at least two are carbon atoms.

26. The compound according to claim 25, wherein when, in addition to the carbon atoms, the groups X and Y contain other atoms these are selected from oxygen and nitrogen.

27. The compound according to claim 26, characterized in that the nitrogenated bidentate chelating agents having the same bridging groups X and Y and contain from 3 to 10 atoms of which at least two are carbon atoms.

28. The compound according to claim 24, characterized in that the nitrogenated bidentate chelating agents are selected from: 2,2'-bipyridyl; 4,4'-dimethyl-2,2'bipyridyl; 4,4'-diphenyl-2,2bipyridyl; 5,5'-dimethyl-2,2-bipyridyl; 5-methyl-2,2'-bypyridyl; 1,10-phenanthroline; 4-methyl-1,10-phenanthroline; 5-methyl-1,10-phenanthroline; 4,7-dimethyl-1,10-phenanthroline; 3,8-dimethyl-1,10-phenanthroline; 4,7-diphenyl-1,10-phenanthroline; 4,7-dichloro-1,10-phenanthroline; 3,4,7,8-tetramethyl-1,10-phenanthroline; 4,4'-dimethyl-5,5'bioxazol and 2,2'-bipyrimidine.

29. The compound according to claim 24, characterized in that A'⁻ is an essentially non-coordinating, non esterificable and non-labile anion selected from hexafluorophosphate, tetrafluoroboate, hexafluoroantimoniate, B(C₆F₅)₄⁻, (3,5-(CF₃)₂—C₆H₃⁻)₄B, and Al(C₆F₅)₄⁻.

30. The compound according to claim 24, which is selected from [bipyH⁺][PF₆⁻], [phenH⁺][PF₆⁻], [bipyH⁺][BF₄⁻].

31. A method for the preparation of catalysts having general formula (I)

[Pd(chel)(chel')⁺⁺][A⁻]₂        (I)

wherein chel and chel', the same or different, represent a nitrogenated or phosphorated bidentate chelating agent, and A⁻ represents an essentially non-coordinating, non esterifiable and non-labile anion of an acid with pKa less than 2, which comprises:

(a) putting palladium acetate in contact with a cocatalyst having general formula (II)

[chel"H⁺][A'⁻]        (II)

wherein chel" and A'⁻ are the same as chel, chel' and A⁻, at a temperature of between 0° and 40° C. and (b) separating the catalyst (I) thus obtained.

32. A bi-chelated complex of palladium having general formula (I)

[Pd(chel)(chel')⁺⁺][A⁻]₂        (I)

wherein chel and chel' the same or different, represent a nitrogenated or phosphorated bidentate chelating agent, and A⁻ is selected from B(C₆F₅)₄⁻, B(3,5-(CF₃)₂C₆H₃)₄⁻ and Al(C₆F₅)₄⁻.

33. The complex according to claim 32, having the formula:

[Pd(bipy)$_2$][B(C$_6$F$_5$)$_4$]$_2$.

34. The complex according to claim 32, having the formula:

[Pd(DPPP)$_2$][B(C$_6$F$_5$)$_4$]$_2$.

35. The complex according to claim 32, having the formula:

[Pd(DPPP)(bipy)][B(C$_6$F$_5$)$_4$]$_2$.

* * * * *

UNITED STATES PATENT AND TRADEMARK OFFICE
CERTIFICATE OF CORRECTION

PATENT NO. : 5,717,060
DATED : February 10, 1998
INVENTOR(S) : Anna SOMMAZZI et al.

It is certified that error appears in the above-indentified patent and that said Letters Patent is hereby corrected as shown below:

On the title page, Item [30], the Foreign Application Data should read:

```
--[30]  Foreign Application Priority Data
April 18, 1996  [IT]     Italy.............MI96A0741
Nov. 17, 1995   [IT]     Italy.............MI95A2368--
```

Signed and Sealed this

Twenty-first Day of April, 1998

Attest:

BRUCE LEHMAN

*Attesting Officer*　　　*Commissioner of Patents and Trademarks*